Dec. 18, 1923.

V. C. TILLIER

PISTON RING EXPANDING TOOL

Filed Feb. 15, 1923

1,477,786

Inventor
Vincent C. Tillier
By Ralgemond A. Parker
Attorney

Patented Dec. 18, 1923.

1,477,786

UNITED STATES PATENT OFFICE.

VINCENT C. TILLIER, OF FLINT, MICHIGAN.

PISTON-RING-EXPANDING TOOL.

Application filed February 15, 1923. Serial No. 619,209.

*To all whom it may concern:*

Be it known that I, VINCENT C. TILLIER, a citizen of France, residing at Flint, county of Genesee, State of Michigan, have invented a certain new and useful Improvement in Piston-Ring-Expanding Tools, and declare the following to be a full, clear, and exact description of the same, such as will enable others skilled in the art to which it pertains to make and use the same, reference being had to the accompanying drawings, which form a part of this specification.

My invention relates to an improved piston ring expander or removing tool.

The object is to provide a simple, efficient, improved piston ring expander, the ring-engaging portions of which may be easily inserted between the opposite ends of a piston ring at the split and which is so constructed that the gripping pressure of the hand applied to the jaws of the expander will operate the tool to spread apart the ring-engaging portions to remove the ring from the piston.

A further object is to provide a piston ring expander of a single piece of spring metal so constructed that the expansive force produced by gripping the jaws within the hand is applied to a piston ring to spread the opposite ends of the ring at the split directly apart without exerting outward radial pull on the ends of the ring.

The above and other objects together with the construction and the operation of the device will more fully appear from the following description, appended claims and accompanying drawing, in which:

Figures 1, 2:
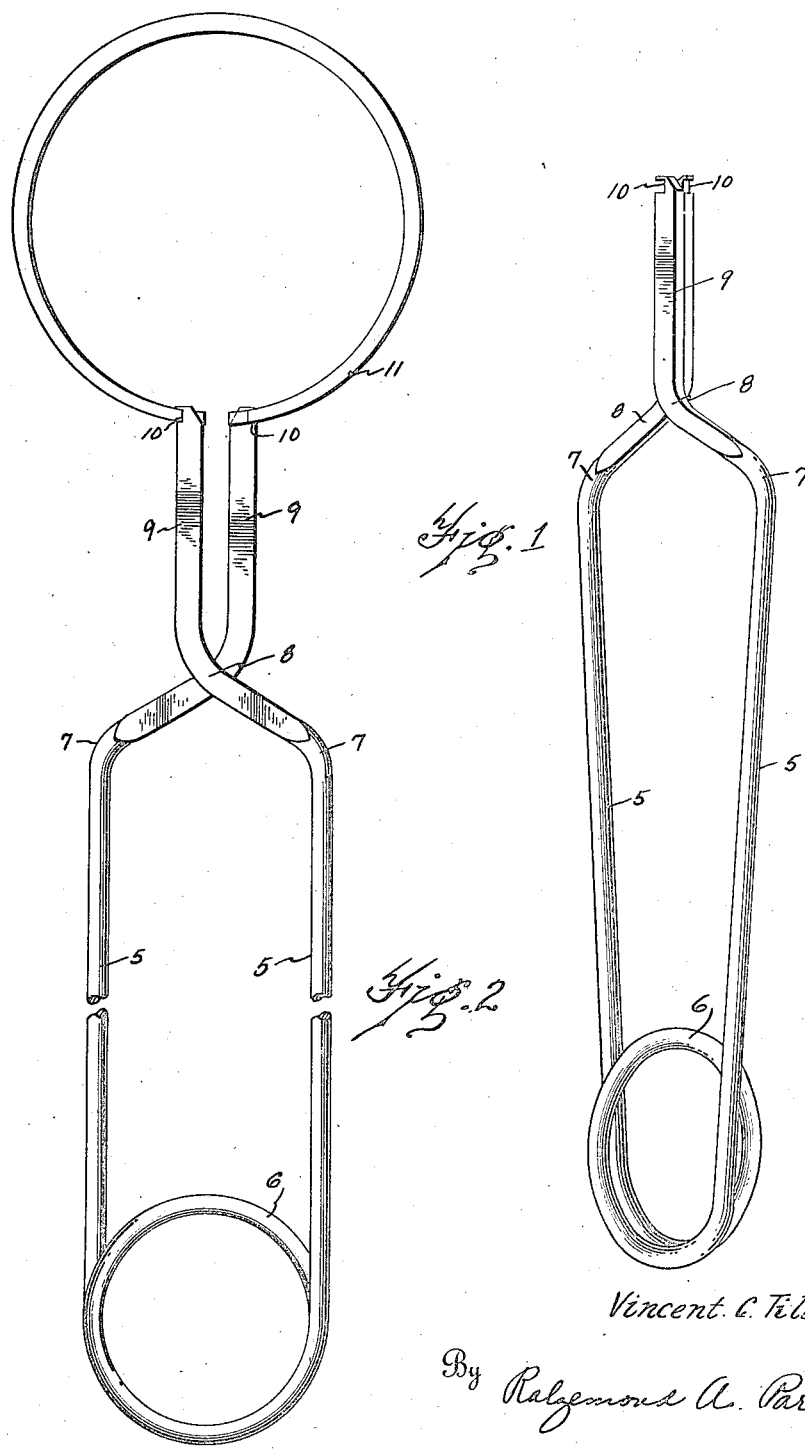
Figure 1 is a perspective of my improved tool.
Fig. 2 is an elevation showing the tool in association with a piston ring.

My improved tool is formed from a single strip of spring metal. I have here shown a spring metal rod bent to form two opposed handles or jaws 5. This rod is so bent that the jaws are connected together at one end by means of a spring coil 6. The jaws extend forwardly tangentially from this coil in substantially parallel relationship and each jaw is bent at an angle as at 7 so the jaws cross each other as at 8 and these end extensions of the jaws are preferably flattened as shown in the drawing. At the crossing point of the jaws each jaw is bent to extend forwardly so that when the tool is in the normal position the end portions 9 of the jaws overlap each other as shown in Fig. 1.

Each jaw is adapted on one face at the tip to engage the end of a piston ring at the slip so that when pressure is applied by the hand to force the jaws together intermediate the spring coil 6 and the crossing point of the jaws, the ring-engaging ends of the jaws are spread apart to expand the ring.

In the construction here shown I have provided the opposite faces of the jaws with a recess 10 which is adapted to fit over the square end of a piston ring 11 as shown in Fig. 2, so as to expand the ring as shown in such figure of the drawing. It is apparent that the gripping faces of the jaws would have to be shaped to engage the different types of piston rings. There are many types of piston rings on the market, some having square ends, others beveled ends of various forms, and the engaging ends of the expander would, therefore, have to be adapted to engage with these various types of ring construction.

In operation the spring handles are forced inwardly by the gripping of the hand between the coil and the crossing point of the handles and the coil also yields so that the ends of the ring are spread substantially directly apart with little, if any, radial pull outwardly.

What I claim is:

1. A piston ring expander, consisting of a single piece of spring metal bent to form a pair of jaws connected together at one end by a spring coil and crossing each other intermediate the coil and the opposite end of the jaws and having overlapping free ends the tips of which are provided on opposite faces to engage the ends of a piston ring.

2. A piston ring expander formed of a one-piece spring metal rod bent to form two jaws connected together at one end by a spring coil, said jaws extending tangentially forwardly in the same general direction but from opposite sides of the coil and in substantially parallel relationship, each jaw bent inwardly intermediate the coil and its free end so that the jaws cross each other, the free ends of said jaws then bent forwardly at the crossing point in substantially overlapping relationship, opposite sides of the tips of said jaws adapted to engage the ends of a piston ring.

3. A piston ring expander formed of a one-piece metal strip bent to form two jaws connected together by a spring coil, said jaws extending away from the coil in the same direction and bent to cross each other intermediate the coil and their free ends, the opposite side of the tips of the free ends of the jaws adapted to engage the ends of a piston ring.

In testimony whereof I sign this specification.

VINCENT C. TILLIER.